Oct. 8, 1957     S. LEONARDI     2,808,678
DOUBLE CATCH FISH HOOK
Filed March 16, 1956
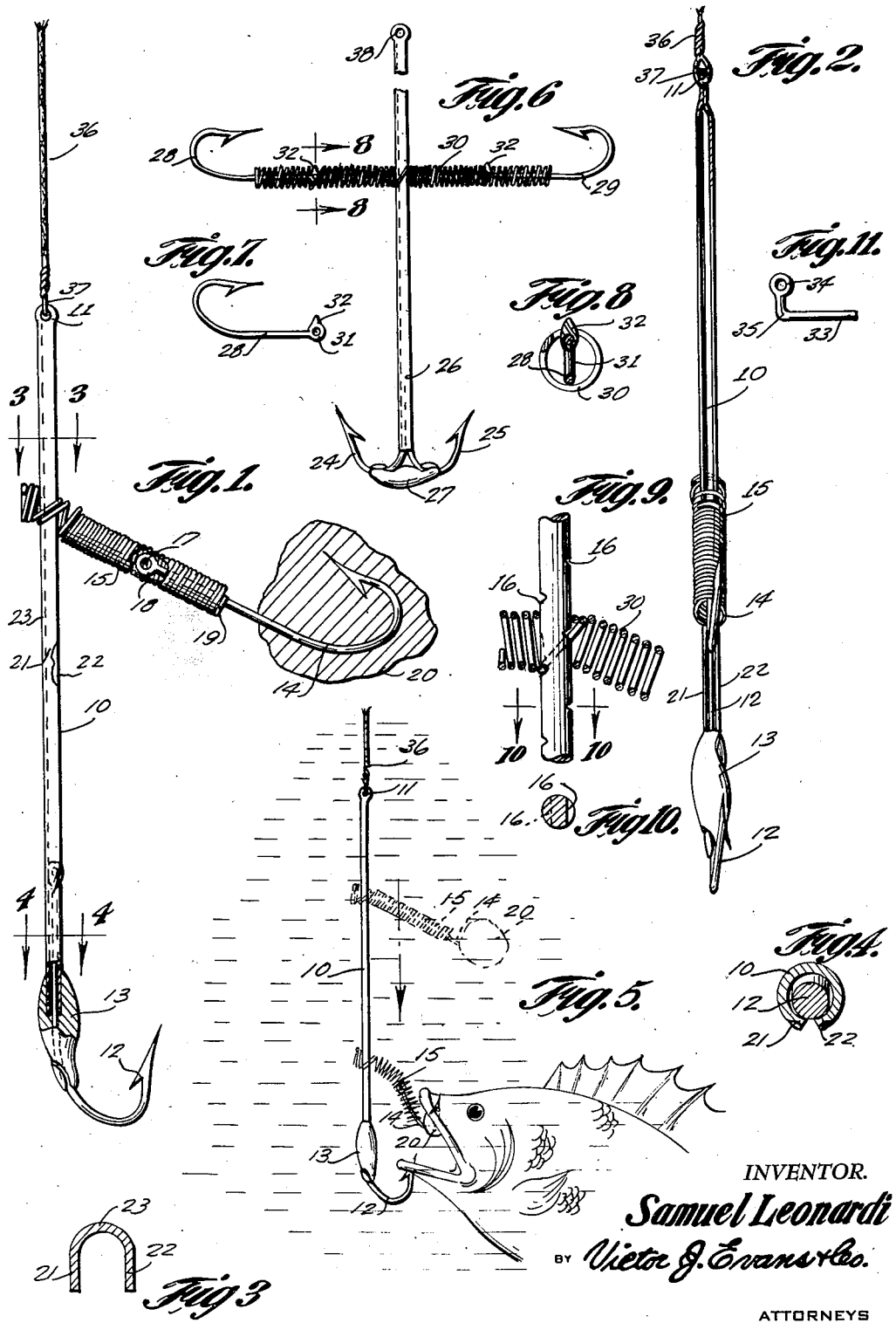
INVENTOR.
Samuel Leonardi
BY Victor J. Evans & Co.
ATTORNEYS

United States Patent Office 2,808,678
Patented Oct. 8, 1957

2,808,678

DOUBLE CATCH FISH HOOK

Samuel Leonardi, Fort Lauderdale, Fla.

Application March 16, 1956, Serial No. 572,104

3 Claims. (Cl. 43—44.8)

This invention relates to fishing tackle and particularly hooks for catching fish, and in particular a hook having an extended shank with a bait carrying hook carried by a spring frictionally retained in adjusted position on the shank and extended above the former hook whereby a fish striking bait on the hook carried by the spring swings downwardly so that the body of the fish is caught with the hook at the lower end of the shank.

The purpose of this invention is to provide a fish hook assembly wherein a fish is secured at a plurality of points including the mouth and a point in the body so that the possibility of a fish escaping is reduced to a minimum.

With the conventional fish hooks the upper part of the mouth or gills of the fish are penetrated by a single hook and unless the hook passes through a portion of the mouth having sufficient strength to prevent being torn by the hook the hook is often displaced and the fish escapes. With this thought in mind this invention contemplates a fish hook having a bait carrying hook suspended by resilient means above the point whereby the strike or weight of the fish extends the resilient means with the result that the body of the fish is engaged with the hook below whereby the fish is caught at two points and if one hook should pull out of the fish the fish will be held by the other hook.

The object of this invention is, therefore, to provide an improved fish hook with which a fish is gripped at a plurality of points instead of being held in the mouth only.

Another object of the invention is to provide a combination bait carrying and fish gripping hook in which the parts are adjustable to compensate for fish of different sizes.

A further object of the invention is to provide an improved fish hook whereby a fish is gripped at a plurality of points in which the hook is of a simple and economical construction.

With these and other objects and advantages in view the invention embodies a fish hook having an elongated shank with an eye on the upper end of the shank, a weight on the lower end and with notches at the spaced points in the intermediate part and a bait carrying hook suspended by a spring from the intermediate part of the shank and located on the shank by the notches in the sides thereof.

Other features and advantages of the invention will appear from the following description taken in connection with the drawing, wherein:

Figure 1 is a side elevational view illustrating the double catch fish hook with parts broken away showing the connection of a hook to the lower end of an elongated shank and also showing the connection of the shank of a hook to a spring.

Figure 2 is a front elevational view of the hook shown in Fig. 1 with part of the upper end broken away showing a section through the eye to which a fishing line is attached.

Figure 3 is a cross section through the shank of the hook taken on line 3—3 of Fig. 1 with the parts shown on an enlarged scale.

Figure 4 is a cross section through the lower end of the shank showing the connection of the hook to the shank taken on line 4—4 of Fig. 1 and also with the parts shown on an enlarged scale.

Figure 5 is a view illustrating the use of the improved fish hook showing a fish with one hook extended through the upper part of the mouth or jaw and the other hook extended through the lower jaw.

Figure 6 is a side elevational view, similar to that shown in Fig. 1 illustrating a modification wherein hooks are extended from both sides of the shank of the hook.

Figure 7 is a view showing one of the hooks of the type used in the assembly shown in Fig. 6.

Figure 8 is a cross section through the resilient mounting means of the bait hooks shown in Fig. 6 being taken on line 8—8 of Fig. 6 and showing the device with the parts on an enlarged scale.

Figure 9 is a view illustrating the method of locating the bait hook carrying spring on the shank of a hook with the parts shown on an enlarged scale and showing one of the coils of the spring retained in position on the shank by notches into which the coil extends.

Figure 10 is a cross section through the shank shown in Fig. 9 showing the notches in the sides of the shank.

Figure 11 is a view showing the eye at the end of a shank of a fish hook in which the eye is extended laterally to facilitate connecting the hook to one of the convolutions of a spring.

Referring now to the drawing wherein like reference characters denote corresponding parts the improved double catch fish hook of this invention includes a shank 10 having an eye 11 at the upper end, a hook 12 extended from the lower end of the shank, a weight 13 mounted at the connection of the hook to the shank, and a bait carrying hook 14 carried by a spring 15 through which the shank 10 extends and which is adapted to be retained in adjusted positions on the shank with notches 16 positioned in the sides of the shank.

The eye 18 extends into the end of the spring 15 securing the hook in position in the spring and, as shown in Fig. 1 a convolution 19 at the end of the spring is wrapped around the shank of the hook to retain the hook in an extended position whereby bait, as indicated by the numeral 20 will be retained in a position spaced from the shank of the device.

In the design shown in Fig. 1 the shank 10 is U-shaped in cross section, as illutsrated in Fig. 3, having side members 21 and 22 connected with an arcuate portion 23 and the hook 12 is secured between the sides 21 and 22 by crimping the sides inwardly over the hook, as shown in Fig. 1.

The weight 13 is also crimped or molded over the lower end of the shank and extended portion of the hook whereby the weight is secured in position and wherein the weight retains the hook assembly in a vertically disposed position, as shown in Figs. 1 and 5.

It will be understood that the shank 10 may be U-shaped in cross section, as shown in Figs. 1 and 3 or may be made of a round rod, as shown in Figs. 9 and 10.

In the design illustrated in Fig. 6 hooks 24 and 25, similar to the hook 12 are secured in the lower end of a shank 26, similar to the shank 10 and a weight 27 is secured over the connection between the hook and shank, or at a suitable point on the hooks, as suggested in Fig. 6, and hooks 28 and 29 are mounted in the ends of the spring 30 that is positioned on the shank 26 through one convolution of which the shank 26 extends, as shown in Fig. 9. With bait carried by the hooks 28 and 29 a pair of fish may be caught by the device with the hooks 28 and 29 positioned in jaws of the fish and with the hooks 24 and 25 secured in points of the fish spaced from the jaws.

The hooks shown in Fig. 6 are provided with eyes 31 on the sides of which lugs 32 are provided, the lugs being positioned to extend into the convolutions of the spring to facilitate retaining the hooks in position thereon.

In the design shown in Fig. 11 a hook 33 is provided with an offset eye 34, the eye being connected to the shank of the hook with an arcuate section 35 whereby the eye is positioned to correspond with one side of one of the convolutions of the spring with the shank portion 33 of the hook on the center of the spring.

It will be understood that the hooks may be secured in the ends of the spring or springs by other suitable means.

With the parts assembled, as illustrated and described, the hook assembly is attached to a fishing line 36 with a loop 37 on the end of the line extended through the eye 11 of the shank 10, or the eye 38 of the shank 26 and with bait on the hook 14, or on the hooks 28 and 29, the device is lowered into the water and with the spring caught in one of the notches 16 the pull of the fish draws a hook on which the bait is positioned downwardly whereby the fish comes in contact with the hook 12 or other hooks at the lower end of the shank so that the hook or hooks at the lower end penetrate the body of the fish so that the fish is held at a point in the body in addition to being held by the hook upon which the bait was positioned, in the mouth. With a fish held at two points is may readily be reeled in with safety.

The hook assembly shown in Fig. 1 is provided with a single bait hook and a single hook at the lower end of the shank and the device shown in Fig. 6 is provided with a pair of hooks for the bait and another pair at the lower end of the shank, and it will be understood that any suitable number of hooks may be provided for bait or for catching the fish at the lower end of the shank.

It will be understood that other modifications, within the scope of the appended claims, may be made in the design and arrangement of the parts without departing from the spirit of the invention.

What is claimed is:

1. In a double catch fish hook, the combination which comprises an elongated shank having hooks and a weight on the lower end and an eye in the upper end, said shank having spaced notches in the intermediate part, and a horizontally disposed coil spring through one of the convolutions of which the shank extends, positioned on the shank and having fish hooks mounted in the extended ends thereof, the notches of the shank being positioned to receive one side of a coil of the spring for retaining the spring in adjusted positions on the shank.

2. In a fishing device, the combination which comprises a fish hook having an elongated shank with an eye on the upper end, a horizontally disposed coil spring having convolutions positioned on the shank of the hook with the shank extended through one of said convolutions of the spring, said spring being frictionally retained in adjusted position on the shank by resiliency inherent therein, a bait carrying hook having a shank with an eye in the extended end positioned with the shank in the extended end of the spring and with the eye of the shank thereof on one of the convolutions of the spring, and a weight secured to the lower end of the shank of the fish hook.

3. In a fishing device, the combination which comprises a fish hook having an extended shank with an eye on the upper end and with spaced notches in opposite sides thereof, a horizontally disposed coil spring having convolutions positioned on the shank of the hook with the shank extended through one of the convolutions thereof and with ends of the spring extended from both sides of the shank, one side of the convolution through which the shank extends being positioned in one of the notches of the shank for retaining the spring in adjusted positions on the shank, bait carrying hooks having shanks with eyes in the ends thereof positioned with the shanks in extended ends of the spring and with convolutions of the spring extended through the eyes on the extended ends of the shanks thereof, and a weight on the lower end of the shank, the bait carrying hooks extended from ends of the spring being positioned whereby a fish striking bait on said bait carrying hooks swings downwardly into engagement with the hook having an elongated shank.

References Cited in the file of this patent

UNITED STATES PATENTS

| | | |
|---|---|---|
| 1,295,370 | Porter | Feb. 25, 1919 |
| 1,681,407 | Howell | Aug. 21, 1928 |
| 2,009,298 | Nelson et al. | July 23, 1935 |
| 2,087,369 | Woodring | July 20, 1937 |

FOREIGN PATENTS

| | | |
|---|---|---|
| 889,397 | France | Oct. 4, 1943 |